(12) United States Patent
Scott et al.

(10) Patent No.: US 9,411,876 B2
(45) Date of Patent: Aug. 9, 2016

(54) METHODS AND DEVICES FOR STORING CONTENT BASED ON CLASSIFICATION OPTIONS

(75) Inventors: Sherryl Lee Lorraine Scott, Toronto (CA); Jason Tyler Griffin, Kitchener (CA); Jerome Pasquero, Montreal (CA); Steven Henry Fyke, Waterloo (CA); David Ryan Walker, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 754 days.

(21) Appl. No.: 13/571,473

(22) Filed: Aug. 10, 2012

(65) Prior Publication Data

US 2014/0046943 A1 Feb. 13, 2014

(51) Int. Cl.
*G06F 7/00* (2006.01)
*G06F 17/30* (2006.01)

(52) U.S. Cl.
CPC ...... *G06F 17/30598* (2013.01); *G06F 17/3028* (2013.01)

(58) Field of Classification Search
CPC .......... G06F 17/30598; G06F 17/3028; G06F 17/3025; G06Q 10/06
USPC .......................................... 707/736, 737, 738
See application file for complete search history.

(56) References Cited

U.S. PATENT DOCUMENTS

| | | | |
|---|---|---|---|
| 6,757,888 B1 | 6/2004 | Knutson et al. | |
| 2009/0113340 A1 | 4/2009 | Bender | |
| 2009/0144657 A1 | 6/2009 | Zhang et al. | |
| 2010/0026846 A1 | 2/2010 | Anderson | |
| 2011/0055765 A1 | 3/2011 | Neubrand et al. | |

FOREIGN PATENT DOCUMENTS

| | | |
|---|---|---|
| EP | 2224386 A1 | 9/2010 |
| GB | 2378109 A | 1/2003 |

OTHER PUBLICATIONS

Fleming, E., Automatic Save Folder—a Firefox Extension for Putting Downloaded Files in Their Proper Place, YAHOO! News Network, voices.yahoo.com/automatic-save-folder-firefox-extension-7539684.html?cat=15, retrieved May 30, 2012, dated Jan. 7, 2011, pp. 1-3.

Wilcox-Brown, N., Getting the Most From EOS Utility, Canon Professional Network, cpn.canon-europe.com/content/product/canon_software/eos_utility.do, retrieved May 30, 2012, dated Jun. 2008, pp. 1-9.

(Continued)

*Primary Examiner* — Md. I Uddin
(74) *Attorney, Agent, or Firm* — Rowand LLP

(57) ABSTRACT

Methods and devices for storing content are described. In one example embodiment, a method includes: displaying, on a display of an electronic device, a plurality of selectable content classification options for classifying a content item, the selectable content classification options including a selectable option to classify the content item as an action item and a selectable option to classify the content item as an archive; receiving, via an input interface associated with the electronic device, a selection of one of the content classification options; and storing the content item in accordance with the selected content classification option.

18 Claims, 8 Drawing Sheets

(56) References Cited

OTHER PUBLICATIONS

Canon Singapore PTE Ltd., Managing Images in a Camera (Creating a Folder/Numberin a File)(EOS REBEL T2i/EOS 600D), support-sg.canon-asia.com/contents/SG/EN8201050600.html, retrieved May 30, 2012, dated Feb. 14, 2011, pp. 1-9.

Agarwal, A., Save Web Pictures with Firefox in Different Folders Automatically, Digital Inspiration, labnol.blogspot.ca/2007/06/download-web-images-with-firefox-in.html, retrieved May 30, 2012, dated Jun. 7, 2007, pp. 1-4.

EPO, Extended European Search Report relating to application No. 12180019.7 dated Dec. 18, 2012.

CIPO, CA Office Action relating to Application No. 2,822,276, dated Dec. 4, 2014.

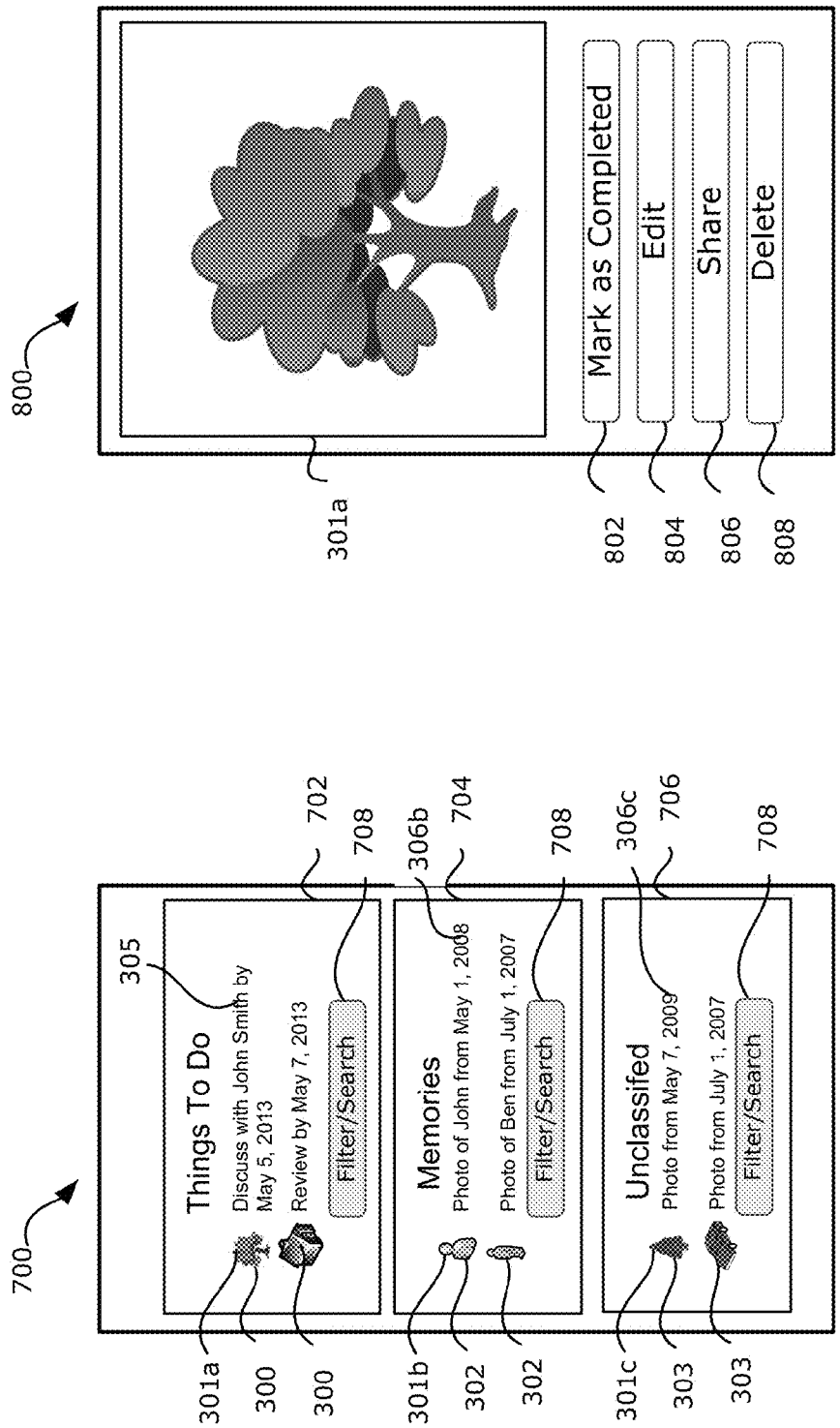

METHODS AND DEVICES FOR STORING CONTENT BASED ON CLASSIFICATION OPTIONS

TECHNICAL FIELD

The present application relates to content storage and classification and, more particularly, to methods and electronic devices for storing a content item as an archive or an action item.

BACKGROUND

Electronic devices, such as smartphones and tablet computers, often allow users to create, receive, and capture content. For example, a camera may be included in an electronic device to allow an image to be captured of a real-world event. Such images may be obtained by a camera application and stored along with other such images in a container reserved for storing such images. For example, images may be stored in a picture folder. A software application or module may access the images in the folder and provide a slideshow or picture album. All images in the folder may be accessed and may be displayed in a common interface. For example, thumbnail images of all images in the folder may be displayed.

Electronic devices may include other applications for accessing or creating other types of content. For example, word processing applications may create word processing documents, notepad applications may create notes, and a personal information manager (PIM) may be used to create tasks.

Such applications provide little control over the manner by which content is stored, classified, or accessed. For example, the manner by which content is stored or classified is largely dependent on the manner by which content is received.

BRIEF DESCRIPTION OF THE DRAWINGS

Reference will now be made, by way of example, to the accompanying drawings which show example embodiments of the present application, and in which:

FIG. 7 is an example display screen in accordance with example embodiments of the present disclosure;

FIG. 8 is an example display screen in accordance with example embodiments of the present disclosure;

Like reference numerals are used in the drawings to denote like elements and features.

DETAILED DESCRIPTION

In one example embodiment, the present application describes a method of storing content. The method includes: displaying, on a display of an electronic device, a plurality of selectable content classification options for classifying a content item, the selectable content classification options including a selectable option to classify the content item as an action item and a selectable option to classify the content item as an archive; receiving, via an input interface associated with the electronic device, a selection of one of the content classification options; and storing the content item in accordance with the selected content classification option.

In another example embodiment, the present application describes an electronic device. The electronic device includes a display and an input interface. The electronic device also includes a processor coupled with the display and the input interface and a memory coupled with the processor. The memory contains processor executable instructions which, when executed by the processor, cause the processor to: display, on a display of an electronic device, a plurality of selectable content classification options for classifying a content item, the selectable content classification options including a selectable option to classify the content item as an action item and a selectable option to classify the content item as an archive; receive, via an input interface associated with the electronic device, a selection of one of the content classification options; and store the content item in accordance with the selected content classification option.

In yet another example embodiment, the present application describes a computer readable storage medium including computer executable instructions for: displaying, on a display of an electronic device, a plurality of selectable content classification options for classifying a content item, the selectable content classification options including a selectable option to classify the content item as an action item and a selectable option to classify the content item as an archive; receiving, via an input interface associated with the electronic device, a selection of one of the content classification options; and storing the content item in accordance with the selected content classification option.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
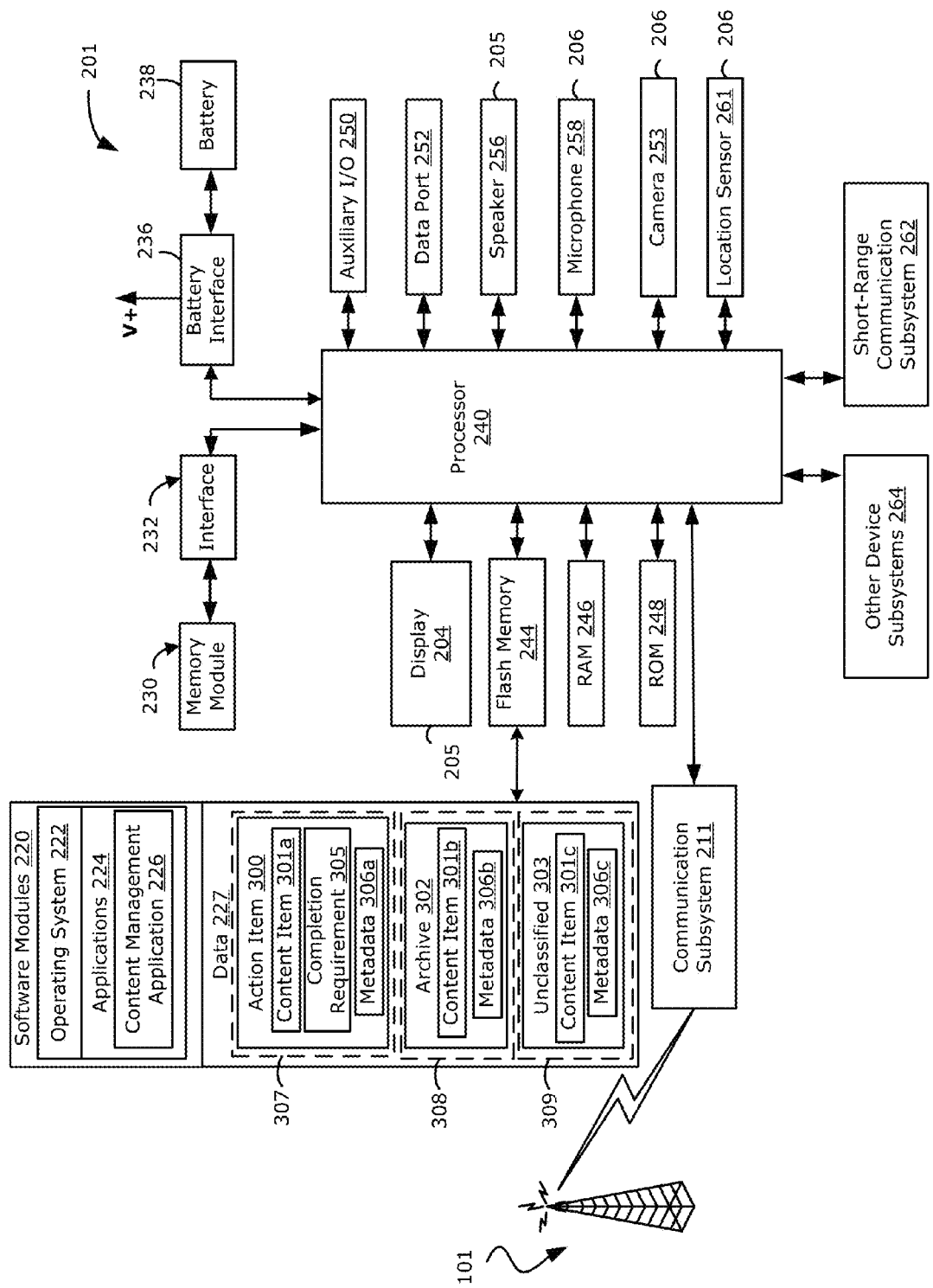
FIG. 1 is a block diagram illustrating an example electronic device in accordance with example embodiments of the present disclosure.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer such as a slate computer, an electronic book reader, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In at least some embodiments, the electronic device 201 is a handheld electronic device. A handheld electronic device is an electronic device 201 which is sufficiently small to be held in the hands of a user. The term handheld electronic device includes smartphones and may also include tablet computers. In at least some embodiments, the handheld electronic device may be sufficiently small to be held in a single hand of a user. For example, the handheld electronic device may be a palm-sized device which is sized to be held in the palm of a user's hand. From the description which follows, it will be appreciated that the techniques and methods described herein may be used in electronic devices 201 having limited display capabilities. For example, the methods of storing, classifying and accessing content described herein may be used with the relatively small displays provided by smartphones.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems, such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, a camera 253, a location sensor 261, one or more microphones 258, and/or a touch-sensitive overlay associated with a touchscreen display, etc.), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204, one or more speakers 256, or other output interfaces), a short-range communication subsystem 262, and other device subsystems generally designated as 264. Some of the subsystems shown in FIG. 1 perform communication-related functions, whereas other subsystems may provide "resident" or on-device functions.

One or more of the input interfaces 206 may be configured for receiving user input to allow a user to interact with the electronic device 201. Such input interfaces 206 may, for example, allow a user to interact with a graphical user interface provided on the electronic device 201. Instructions, commands, or other forms of input may be received by the electronic device 201 via the input interfaces. For example, the input interfaces 206 may allow a user to interact with one or more interface elements displayed on a graphical user interface of the display 204.

Such input interfaces 206 may take a variety of forms. For example, any one or combination of the following input interfaces 206 may be included on the electronic device 201 and used for receiving user input: a touchscreen display, a control button, a trackball or trackpad, a keyboard, a camera 253 (which may be used, for example, to detect gesture-based input), an orientation or acceleration sensor such as an accelerometer (which may be used, for example, to detect gesture-based input performed by moving the electronic device 201), a microphone 258 (which may be used, for example, to detect voice-based commands). It will be appreciated that the foregoing list of input interfaces 206 is not exhaustive and that other input interfaces 206 may be used instead of or in addition to any of the interfaces 206 described above.

As noted previously, the electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

The electronic device 201 may include one or more cameras 253. The camera 253 is configured to generate camera data, such as images in the form of still photographs and/or motion video. The camera data may be captured in the form of an electronic signal which is produced by an image sensor (not shown) associated with the camera 253. More particularly, the image sensor is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera data).

The cameras 253 may include a front facing camera, a rear facing camera or both. A front facing camera is a camera 253 which is generally located on or near a front face of the electronic device 201. The front face is typically the face on which the display 204 is mounted. That is, the display 204 is configured to display content which may be viewed from a side of the electronic device 201 where the front facing camera is directed. A rear facing camera is a camera 253 which is located to obtain images of a subject near a rear face of the electronic device 201. The rear face is typically a face which does not include the main display 204 of the electronic device 201. The rear face is, in at least some embodiments, located at a side of the electronic device 201 which is opposite the side which includes the display 204. The rear facing camera may obtain images which are not within the field of view of the front facing camera. The field of view of the front facing and rear facing cameras may generally be in opposing directions.

In some embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed.

In some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network.

In the example embodiment illustrated, the electronic device 201 also includes a memory module 230 (which may be flash memory) and a memory module interface 232. The memory module 230 may be removable from the electronic device 201. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

The data 227 may include one or more content items 301a, 301b, 301c. A content item 301a, 301b, 301c may, for example, be a video (such as, for example, an MPEG video, WMV video, AVI video, etc.), audio (such as, for example, an MP3 audio file, a WAV audio file, a RealAudio audio file, etc.), a word processor document (such as a Microsoft Word™ file, etc.), a spreadsheet (such as a Microsoft Excel™ file), an electronic book (such as an e-book in an EPUB, MOBI, or other file format), a presentation (such as a Microsoft PowerPoint™ presentation), a Portable Document Format (PDF) document, a note (such as a text based note prepared using a note-taking application), or an image (such as a raster, vector or 3D graphic image including, for example, a JPEG file, TIFF file, etc.). In at least some embodiments, the content items may include a content item that is text, such as text that may be entered into a list. Other types of content items 301a, 301b, 301c apart from those types listed above may also be stored in memory of the electronic device 201. Furthermore, in at least some embodiments, a content item 301a, 301b, 301c may not, be stored in permanent memory. For example, in at least some embodiments, a content item 301a, 301b, 301c may be a document that a user is currently editing and that may not have yet been stored to a permanent storage location. Such documents may, for example, be stored in a temporary memory such as a cache.

The content items 301a, 301b, 301c may have been received at the electronic device 201, for example, via one or more of the input interfaces 206. For example, a video may be received from the camera 253 (and an audio component of such video may be received from the microphone 258). Similarly, audio may be received from the microphone 258 and an image may be received from the camera 253. Text-based content items 301a, 301b, 301c, such as a word processor document, spreadsheet, presentation, or note, may be received, for example, via a keyboard which may be a physical keyboard associated with the electronic device 201 or a virtual keyboard provided on a touchscreen display 204 of the electronic device 201. Those of skill in the art will recognize that other means of receiving content are also possible.

As illustrated in FIG. 1, a content item 301a, 301b, 301c may be stored as an action item 300 (which may also be referred to as tasks) or as an archive 302 or, in some embodiments, as an unclassified content item 303. An archive 302 is a content item 301b which a user may not wish to act on or which may simply wish to use as a reference. That is, an archive 302 is a content item 301b which may not be planned to be acted upon. More particularly, no specific and definite action may, for example, be planned for the content item 301b that is stored as an archive 302. The archived content item 301b may simply be stored for access at an unspecified later date or time so that, for example, the user may recollect a feeling associated with or represented by the content item 301b. Thus, the archived content item 301b may serve as a record or reminder of a feeling and does not serve as a record of a future action (i.e. it does not serve as a reminder of an action that a user intends to perform).

By way of example, personal photographs (such as images captured of family, friends, or captured while on a vacation), personal videos (such as home videos of family, friends, a vacation, etc.), or personal audio files (such as a voicemail message or other audio recording of a friend or family), may serve as a record or reminder of a feeling or memory. Such content items 301b may be stored as an archive 302 to allow a user to later retrieve and view such content items, for example, to recollect the feeling or memory.

In contrast, an action item 300 may represent a content item 301a that a user intends to act on. More particularly, an action item 300 is a content item 301a for which a concrete, defined action is planned. For example, a content item 301a classified as an action item 300 may be content which a user intends to review, e-mail or follow up on. Accordingly, an action item 300 may be a record of an action that a user wishes to be reminded of. That is, the action item 300 may be a record of a future action (i.e. an action that a user intends to perform in the future). More particularly, the action item 300 may serve as a record for a user to remind the user that an action is required.

By way of example, an image captured of a product that a user wishes to research may represent a content item which may be stored as an action item 300. For example, a user may capture an image or video of a product when they are at a store and may store the image or video as an action item 300 when they intend to follow up on the image or video; for example, by performing research on the product when they have time and facilities to do so.

A content item 301 stored as an action item 300 may have one or more completion requirements 305 associated therewith. The completion requirements specify one or more requirements for completing the action associated with the action item 300.

By way of example, the completion requirements 305 may specify timing information for completing the action represented by an action item 300. Such timing information may be referred to as a "when" completion requirement or timing completion requirement. For example, the "when" completion requirement may specify a date or time period during which the action item 300 is to be completed or when a reminder to complete the action item 300 is to be generated. Such a date or time may be referred to as a due date or deadline.

By way of further example, the completion requirements 305 may specify a contact (such as a person or business) associated with the action item 300. The contact may, for example, be someone whose presence will be necessary or desirable for completion of the action represented by the action item 300. For example, completion of the action may require discussions with the contact. Such a required contact may be referred to as a "who" completion requirement or contact completion requirement.

By way of further example, the completion requirements 305 may specify a location associated with the action item 300. The location may, for example, be a location where the action item 300 is to be completed or where the action item 300 may be completed or may be a location where the user wishes to be reminded of the action item 300. That is, a location related to the action item 300 may be specified (such as a location at which the action item 300 will become relevant). When such a location is specified in an action item 300, the location may be referred to as a "where" completion requirement or a location completion requirement for that action item 300.

The electronic device 201 may be configured to automatically generate a reminder based on one or more of the completion requirements 305. That is, the completion requirements 305 may act as reminder conditions and the electronic device 201 may automatically generate reminders based on such information. For example, a due date or deadline associated with an action item 300 (e.g. a "when" context item) may used to trigger a reminder when the due date or deadline is expiring or when the due date or deadline is imminent.

Similarly, when a completion requirement 305 of an action item 300 specifies a contact associated with the action item 300, a reminder may be triggered by identifying possible interactions with that contact and by triggering a reminder when actual or possible interactions with that contact are identified.

Similarly, when a completion requirement 305 of an action item 300 specifies a location associated with the action item 300, a reminder may be triggered based on the location associated with the action item 300 and also based on the current or future location of the electronic device (and/or its user). For example, the reminder may be triggered when the electronic device 201 (or the user) is determined to be close to the location associated with the action item 300 or may be triggered when the user is planning on being close to the location.

Since the completion requirements 305 may be used for generating reminders, the completion requirements 305 may also be referred to as reminder conditions.

The reminder generated by the electronic device 201 based on the completion requirements 305 may, for example, be a sensory based reminder, such as an audible reminder (provided on the speaker 256), a visual reminder (provided on the display 204), or a vibratory reminder (provided by a vibrator associated with the electronic device 201).

Accordingly, a content item 301a stored as an action item 300 may differ from a content item 301b stored as an archive 302 in one or more of the following respects. In some embodiments, an action item 300 may specify completion requirements 305, while an archive 302 does not specify such completion requirements 305 (since no action is required to be completed with respect to the archive 302). Similarly, in some embodiments, reminders may be triggered based on action items 300 but reminders may not be triggered based on archives 302. Similarly, in some embodiments, action items 300 may have a concrete action associated therewith while archives 302 have no concrete actions associated therewith. Action items 300 may be stored so that an action is completed in the future based on the content item while archives 302 may be stored simply to allow a user to access the content item in the future. In at least some embodiments, an action item 300 may also include information defining the nature of the action to be completed. For example, the action item 300 may specify what it is that the user is required to do in order to mark the action item 300 as being completed.

As will be described in greater detail below, in at least some embodiments, action items 300 and archives 302 may differ in that it may be easier to delete an action item 300 than an archive 302. That is, archives 302 may be considered by the electronic device 201 to be more permanent than action items 300 and, therefore, may be more difficult to remove from the electronic device 201. Accordingly, in some embodiments, the electronic device 201 may apply a higher level deletion policy to archives 302 and a lower level deletion policy to action items 300. A higher level deletion policy is a policy that makes deletion more difficult than a lower level deletion policy. For example, a higher level deletion policy may require a greater number of steps to perform a deletion than a lower level deletion policy.

For example, in some embodiments, when a request to delete an action item 300 is received, the action item 300 may be removed from memory or moved to a recycle bin but when a request to delete an archive 302 is received, a prompt may be displayed requesting confirmation of the deletion (e.g. Are you sure you want to delete this item?). For a content item 301b that is an archive 302, removal from memory or relocation to a recycle bin may only occur when confirmation of deletion is received in response to the prompt. By applying a higher level deletion policy to the archives 302 and a relatively lower level deletion policy to the action items 300, the electronic device 201 may achieve a balance between efficiency and security from the effects of accidental deletion. In some embodiments, archives 302 may be made more difficult to delete than action items 300 since archives 302 may represent more treasured content.

In at least some embodiments, action items 300 may have a completion indicator and/or progress indicator associated therewith. A completion indicator may be a flag that may be set to "complete" or "incomplete" to indicate whether the action associated with an action item 300 has been completed. In some embodiments, the completion indicator may have two possible values—a first value represents a complete state and a second value represents an incomplete state. A progress indicator may allow greater precision in describing a status of an action item 300. For example, a progress indicator may specify the degree to which the action has been completed (e.g. it may be specified as a percentage, such as 50%). In some embodiments, the progress indicator may allow a text-based status to be set to indicate the level of completion of the action associated with an action item 300. By way of example, the progress indicator may be set to "not started", "in progress," "waiting for feedback," or "done."

In some embodiments, action items 300 and archives 302 may include metadata 306a, 306b. Metadata 306a, 306b is data which describes and gives information about other data.

More particularly, metadata 306a, 306b may describe and give context to a content item 301a, 301b. For example, the metadata 306a, 306b may specify a title of the content item 301a, 301b, a folder or project associated with the content item 301a, 301b, or a time of creation of the content item 301a, 301b (which may be the time and date when the content item was captured, stored or received). In at least some embodiments, the metadata 306a, 306b may specify people referred to or captured in the content item 301a, 301b (such as the name of a person who is the subject of an image, video or text based document). In some embodiments, the metadata 306a, 306b may also specify a description of a location where the content item 301a, 301b was created. For example, the metadata 306a, 306b may specify a city where an image was captured. Similarly, in some embodiments, the metadata 306a, 306b may include a description of an event where the content item 301a, 301b was created.

Figure 2:
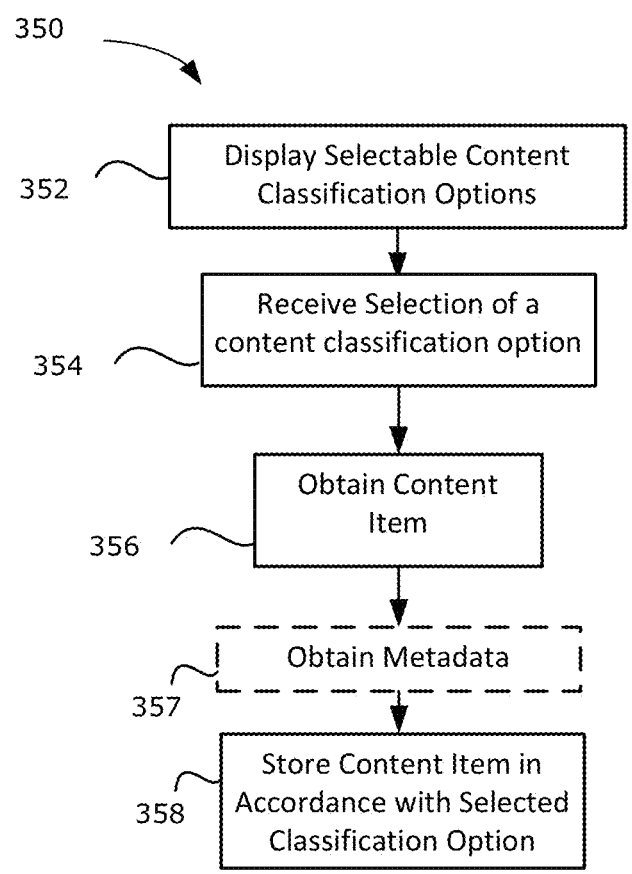
FIG. 2 illustrates a flowchart of an example method of storing content items in accordance with example embodiments of the present disclosure.

As will be described in greater detail below when FIG. 2 is discussed, the metadata 306a, 306b may be received, for example, from a user via an input interface 206 of the electronic device 201 and/or may be automatically generated by the electronic device 201.

In at least some embodiments, the data 227 may also include one or more content items 301c that are unclassified content items 303. An unclassified content item 303 is a content item 301c which has not yet been classified as an archive 302 or an action item 300. An unclassified content item 303 may be a content item 301c which a user has deferred classifying. For example, an unclassified content item 303 may be a content item 301c which a user has not yet had time to classify. Since such content items have not yet been classified, they may not yet have any completion requirements associated therewith. That is, such content items 301c are not yet associated with an action; they do not act as or represent a task.

The unclassified content items 303 may also include metadata 306c. Such metadata 306c may be of the type described above with reference to the action items 300 and the archives 302 and may be obtained in the manner described above and in greater detail below with reference to FIG. 2.

In at least some embodiments, the electronic device 201 may be configured to store content items 301 in containers 307, 308, 309. A container 307, 308, 309 may be an actual or virtual location in memory for storing similar content. A container 307, 308, 309 may, for example, be a folder within a file structure provided in memory of the electronic device 201.

In some embodiments, a container 307 may group commonly classified content items 301a, 301b, 301c. For example, a first container 307 (which may also be referred to as an action item container) may store action items 300. That is, the first container 307 may store content items 301a that have been classified as action items 300. In some embodiments, the first container 307 may store all content items 301a that have been classified as action items 300 but may not store content items 301b that have been classified as an archive 302 (since such items may be stored in a second container 308) or content items 301c that have not yet been classified (since such items may be stored in a third container 309). While FIG. 1 illustrates a first container 307 that includes a single content item 301a that has been classified as an action item 300, the first container 307 may store a plurality of content items 301a. Thus, the first container 307 may represent a group of content items 301a that are classified as action items 300.

Similarly, in some embodiments, a second container 308 (which may also be referred to as an archive container) may store archives 302. That is, the second container 308 may store content items 301b that have been classified as archives 302. In some embodiments, the second container 308 may store all content items 301b that have been classified as an archive 302 but may not store content items 301a that are classified as an action item 300 (since such items may be stored in the first container 307) or content items 301c that have not yet been classified (since such items may be stored in the third container 309). While FIG. 1 illustrates a second container 308 that includes a single content item 301b that has been classified as an archive 302, the second container 308 may store a plurality of content items 301b. Thus, the second container 308 may represent a group of content items 301b that are classified as archives 302.

Similarly, in some embodiments, a third container 309 (which may also be referred to as an unclassified container) may store unclassified content items 303. That is, the third container 309 may store content items 301c that are awaiting classification. In some embodiments, the third container 309 may store all content items 301c that have not yet been classified (i.e. it may store all content items that are stored as unclassified content items 303). The third container 309 does not store content items 301a, 301b that have been classified. For example, the third container does not store content items 301a that have been classified as action items 300 (since such items may be stored in the first container 307) or content items 301b that have been classified as an archive 302 (since such items may be stored in a second container 308). While FIG. 1 illustrates a third container 309 that includes a single unclassified content item, the third container 309 may store a plurality of unclassified content items. Thus, the third container 309 may represent a group of content items 301c that are unclassified content items 303.

By grouping content items according to their classification, content items 301a, 301b, 301c may easily be displayed or accessed along with other similarly classified content items. For example, a list of content items stored in a specific container may be displayed. By way of example, if input is received requesting the display of content items 301a stored in the first container 307, then the electronic device 201 may display a list of content items 301a stored in the first container 307 (e.g. the action items 300 could be displayed in a list). Such a list would exclude content items 301b, 301c not included in the first container 307. Similarly, if input is received requesting the display of content items 301b stored in the second container 308, then the electronic device 201 may display a list of content items 301b stored in the second container 308 (i.e. the archives 302 could be displayed in a list). Such a list would exclude content items 301a, 301c not included in the second container 308. By way of further example, if input is received requesting the display of content items 301c stored in the third container 309, then the electronic device 201 may display a list of content items 301c stored in the third container 309 (i.e. the unclassified content items 303 could be displayed in a list). Such a list would exclude content items 301a, 301b not included in the third container 309.

Other methods of grouping action items 300 and/or archives 302 may be used in some embodiments. For example, in one embodiment, a group may be created that includes both action items 300 and archives 302. For example, a grocery list group may be created to include action items and archives that represent a list of grocery items. Archives 302 included in the grocery list group may, for example, specify items that remain on the grocery list even after they are picked up. For example, the archives 302 in the grocery list group may represent items that a user picks up frequently, such as perhaps bread, milk, etc. Action items 300 included in the grocery list group may, for example, specify items that are not frequently picked up by the user—for example, ingredients in a specific recipe that a user wishes to prepare. The archives 302 and the action items 300 in the grocery list group may, in at least one operating mode, be displayed together in a type of grocery item list. In at least some embodiments, action items 300 may be displayed with a checkbox or other interface element that allows such action items 300 to be marked as completed. In at least some embodiments, archives 302 may not be displayed with such a checkbox or interface element.

In some embodiments, archives 302 and action items 300 may selectively be grouped into a project group. The project group may represent archives 302 and action items 300 that are related to a particular project. The action items 300 may represent actions that require completion for the project and the archives 302 may represent documents or other content that a user may wish to refer to regarding the project.

The grouping of archives 302 and action items 300 may, in at least some embodiments, be performed by a user. For example, user input may be received via an input interface assigning an action item or archive to a specific group. In at least some embodiments, such input may be received at the time of creating the action item or archive.

Methods for classifying content items 301a, 301b, 301c as action items 300 or archives 302, methods for marking a content item 301c as an unclassified content item, and methods for using and accessing such content items 301a, 301b, 301c will be discussed in greater detail below.

The data port 252 may be used for synchronization with a user's host computer system (not shown). The data port 252 may enable a user to set preferences through an external device or software application and extends the capabilities of the electronic device 201 by, for example, providing for information or software downloads to the electronic device 201 other than through the wireless network 101. This download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic, for example, through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 may automatically be routed to the electronic device 201 using the USB cable or Bluetooth® connection. Similarly, any traffic destined for the wireless network 101 may automatically sent over the USB cable Bluetooth® connection to the host computer system for processing.

The electronic device 201 may include or be connectable to a power source. In the embodiment illustrated, the power source is a battery 238, such as a rechargeable battery that may be charged, for example, through charging circuitry coupled to a battery interface 236 such as the serial data port 252. The battery 238 may provide electrical power to at least some of the electrical circuitry in the electronic device 201, and the battery interface 236 may provide a mechanical and electrical connection for the battery 238. The battery interface 236 may be coupled to a regulator (not shown) which may provide power V+ to the circuitry of the electronic device 201.

In some embodiments, a short-range communication subsystem 262 may provide for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A location sensor 261 may be configured to determine a geographic location of the electronic device 201. That is, the location sensor 261 may be configured to act as a positioning system to determine the location of the electronic device 201 in space. In some embodiments, the location sensor 261 may be a global positioning system (GPS) sensor which is configured to determine a location using satellites. The location sensor 261 may take other forms in other embodiments. For example, the location sensor 261 may determine location through triangulation by measuring the strength and direction of signals from two or more nearby cell phone towers.

A pre-determined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data items, such as email messages, for example, using the input interfaces 206, such as the touchscreen display 204. These composed items may be transmitted through the communication subsystem 211 over the wireless network 101.

In the voice communication mode, the electronic device 201 provides telephony functions and may operate, for example, as a typical cellular telephone. The overall operation may be similar to the data communication mode, except that the received signals may be output to the speaker 256 and signals for transmission may be generated by a transducer such as the microphone 258. The telephony functions may be provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 1, the software modules 220 include operating system software 222 and software applications 224, such as a content management application 226. Functions and features provided by the content management application 226 will be described in greater detail below with reference to FIGS. 2 to 10.

In at least some example embodiments, the operating system 222 may perform some or all of the functions of the content management application 226. In other example embodiments, the functions or a portion of the functions of the content management application 226 may be performed by one or more other applications. Further, while the content management application 226 has been illustrated as a single block, the content management application 226 may include a plurality of software modules. In at least some example embodiments, these software modules may be divided among multiple applications. For example, in at least some embodiments, a different software application or module may be used for classifying content items than is used for accessing such content items. For example, a first software application or module may be configured to perform one of the methods described below and a second software application or module may be configured to perform another one of the methods described below.

The electronic device 201 may include a range of additional software applications 224, including for example, a notepad application, a word processing application, an image viewing and/or editing application, a calendar application, an address book application, a mapping application, or a media player application (such as a video player and/or an audio player), or any combination thereof. Each of the software applications 224 may include layout information defining the placement of particular fields and graphic elements (e.g. text fields, input fields, icons, etc.) in the user interface (i.e. the touchscreen display 204) according to the application. In at least some example embodiments, the software applications 224 may include pre-determined gesture information defining functionalities associated with the pre-determined gestures received via the touchscreen display 204. For example, a software application 224 may determine a finger swiping movement (i.e. a pre-determined gesture) on the touchscreen display 204 as a scrolling function.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Storing a Content Item in Accordance with a Selected Classification Option

The following discussion will refer to example methods 350 (FIG. 2), 400 (FIG. 4) of storing a content item in accordance with a selected classification option. Reference will be made to various example display screens to facilitate understanding of the example methods. The methods 350, 400 may, in at least some embodiments, be performed by the content management application 226. More particularly, the content management application 226 (and/or another application 224 stored in memory) may contain processor-executable instructions which, when executed, cause the processor 240 of the electronic device 201 to perform the methods described below. The processor-readable instructions may be configured to cause the processor 240 to generate one or more screens having the features described below.

Referring now to FIG. 2, an example method 350 of storing a content item in accordance with a selected classification option is illustrated. The features of the method 350 will be discussed with reference to the example display screen 360 of FIG. 3.

At 352, a plurality of selectable content classification options 366 (FIG. 3) for classifying a content item 301*d* are displayed on a display 204 associated with the electronic device 201.

The content item 301*d* may be a content item of the type described above with reference to FIG. 1. For example, the content item 301*d* may be a video, audio, a word processor document, a spreadsheet, an electronic book, a presentation, a Portable Document Format (PDF) document, a note, or an image. The content item 301*d* may be of another type not specifically described herein.

The displayed selectable content classification options 366 (FIG. 3) may include a selectable option 368 (FIG. 3) to classify the content item 301*d* as an action item 300. The selectable option 368 (FIG. 3) to classify the content item 301*d* as an action item 300 may be an option to create an action item 300 based on the content item 301*d*.

The displayed selectable content classification options 366 (FIG. 3) may also include a selectable option 370 (FIG. 3) to classify the content item 301*d* as an archive 302. The distinction between an action item 300 and an archive 302 is discussed in greater detail above with reference to FIG. 1.

Figure 3:
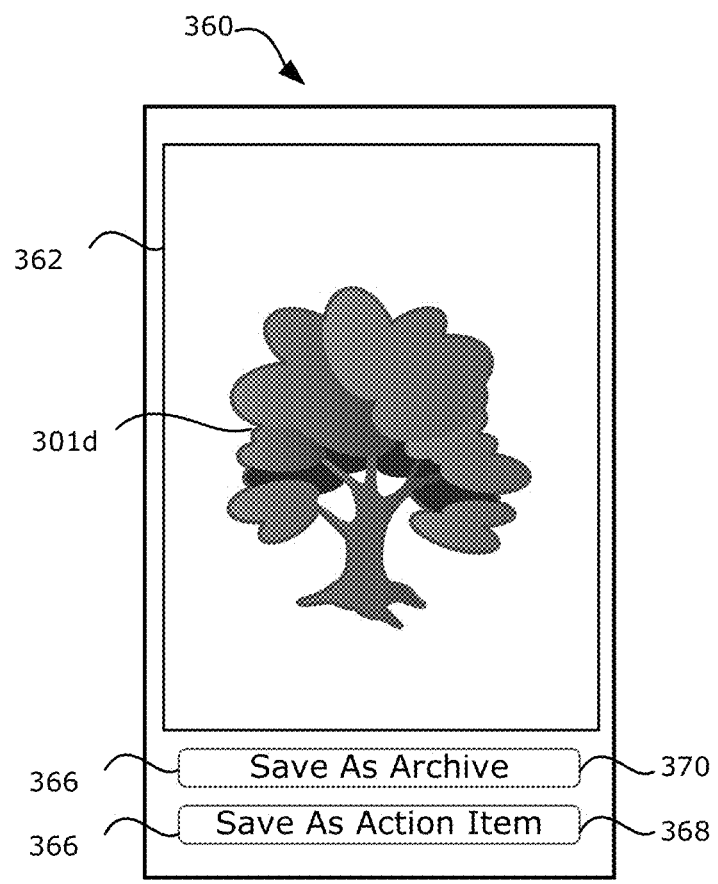
FIG. 3 is an example display screen in accordance with example embodiments of the present disclosure.

Referring briefly to FIG. 3, an example of a display screen 360 that displays such selectable content classification options 366 (FIG. 3) is illustrated. More particularly, in the example illustrated, the selectable option 368 to classify the content item 301*d* as an action item 300 is displayed concurrently with the selectable option 370 (FIG. 3) to classify the content item 301*d* as an archive 302. That is, these selectable options 368, 370 are displayed simultaneously.

Furthermore, these selectable options 368, 370 both relate to the same content item 301*d* and are provided within a common application (e.g. in the example illustrated they are both provided within a content management application 226 which is a camera application). Accordingly, the selectable options 368, 370 allow a user to determine how a content item 301*d* is to be treated. In this example, a user is provided with the ability to treat the same content as either an action item 300 or an archive 302.

Furthermore, these selectable options 368, 370 may be provided on electronic devices 201 having small displays such as, for example, handheld electronic devices. In the example illustrated, the display screen 360 is sized for use on a mobile communication device. However, such selectable options 368, 370 may be provided on electronic devices 201 having smaller displays than that illustrated. For example, such selectable options 368, 370 could be provided on a wearable electronic device 201, such as a watch.

In the example illustrated, the content management application 226 is a camera application. That is, the content management application 226 is an application that is configured to receive camera data from the camera 253. In the example embodiment illustrated, such camera data may be displayed, for example, in a viewfinder 362. The viewfinder 362 may show a field of view of the lens of the camera 253 which may be used in framing and focusing the picture. The camera 253 data may define the content item 301*d*.

It will be appreciated that the content management application 226 may take other forms in other embodiments. For example, the content management application 226 may be any one or combination of: a camera application, a video recording application, a notepad application, a word processor application, an electronic messaging application, or an application of another type.

Referring again to FIG. 2, at 354 a selection of one of the content classification options is received. The selection may be received, for example via an input interface 206 associated with the electronic device 201. By way of example, any one or combination of the following input interfaces 206 may be used for receiving user input: a touchscreen display, a control button, a trackball or trackpad, a keyboard, a camera (which may be used, for example, to detect gesture-based input), an orientation or acceleration sensor such as an accelerometer (which may be used, for example, to detect gesture-based input performed by moving the electronic device 201), a microphone 258 (which may be used, for example, to detect voice-based commands). It will be appreciated that the foregoing list of input interfaces 206 is not exhaustive and that other input interfaces 206 may be used instead of or in addition to any of the interfaces 206 described above.

The method 350 may include, at 356, obtaining or receiving the content item 301d associated with the request. In some embodiments, such as those illustrated in FIGS. 2 and 3, the selection of a classification option 366 (FIG. 3) may be received before the content item 301d is created. That is, the content item 301d may be created shortly after the selection of a classification option 366 (FIG. 3) is received. Accordingly, in some embodiments, the feature 356 of obtaining the content item 301d may be performed shorty after receiving (at 354) the selection of a content classification option 366 (FIG. 3).

In some embodiments, the content item 301d may be obtained and/or created in response to receiving (at 354) the selection of the content classification option 366 (FIG. 3). For example, in some embodiments, in response to receiving a selection of the option to classify the content item 301d as an action item 300 or a selection of the option to classify the content item 301d as an archive 302, the electronic device 201 may capture an image using a camera 253 associated with the electronic device 201. That is, the selectable content classification options 366 may serve a dual purpose—they may define how a content item is to be classified and they may also act as a shutter button to cause the content item to be captured. It will be appreciated that dual purpose selectable content classification options may be useful to save time (i.e. rather than having to activate a shutter button and then classify the image, a user may simply select a single selectable content classification option) and to save space on the display 204 (i.e. rather than having to display a shutter button and selectable content classification options, only the selectable content classification options are displayed).

In other embodiments, the content item 301d may be created before the selection of the selectable content classification option 366 is received. That is, the feature 356 of obtaining the content item 301d, may be performed prior to the feature 354 of receiving selection of a content classification option 366 (FIG. 3). For example, when the content management application 226 is a document creation application, such as a word processing application, a notepad application, etc., the content item 301d may be created, such as, through user input (e.g. via a keyboard) and after the content item is created the selectable content classification options 366 may be displayed on the display 204.

After a selection of one of the content classification options is received, at 358 the electronic device 201 may store the content item 301d in accordance with the selected content classification option 366 (FIG. 3).

In at least some embodiments, at 358, the content item 301d may be stored in a container 307, 308, 309 that corresponds to the selected content classification option 366. For example, if a selection of the option 368 to classify the content item as an action item 300 is received, then the content item 301d may be stored in a first container 307 (FIG. 1), which may also be referred to as an action item container. Similarly, if a selection of the option 370 to classify the content item as an archive 302 is received, then the content item 301d may be stored in a second container 308 (FIG. 1), which may also be referred to as an archive container. These containers 307, 308 are described in greater detail in the discussion of FIG. 1 above.

In at least some embodiments, at 358 an action item 300 may be created based on the content item 301d if the selectable option 368 to classify the content item 301d as an action item 300 is selected.

Similarly, at 358 the content item 301d may be stored as an archive 302 if the selectable option to store the content item 301d as an archive 302 is selected. Action items 300 and archives 302 are described in greater detail in the discussion of FIG. 1.

Optionally, in at least some embodiments, at 358 the content item 301d may be stored together with metadata 306a, 306b, 306c. The metadata 306a, 306b, 306c may describe and give context to a content item. As noted above, the metadata 306a, 306b, 306c may specify a title of the content item, a folder or project associated with the content item, a time of creation of the content item, people or things referred to or captured in the content item, a description of a location where the content item was created, and/or a description of an event where the content item was created.

Accordingly, in at least some embodiments, the method 350 may include, at 357, obtaining metadata. In some embodiments, the metadata may be obtained from a user via an input interface 206 of the electronic device 201. That is, metadata may be received via user input. A user may be permitted to specify metadata 306a, 306b, 306c to be associated with the content item. For example, a user may input a description of an event where the content item was created (e.g. using an input interface 206, such as a keyboard).

In some embodiments, some or all of the metadata 306a, 306b, 306c may be automatically generated by the electronic device 201. Accordingly, metadata may be obtained at 357 by automatically generating metadata. For example, metadata that specifies a time of creation of the content item may be automatically generated using the time specified by a clock associated with the electronic device 201 when the content item was created. Similarly, metadata that specifies a location of the content item may be generated based on a location obtained from a location sensor 261 when the content item was created. Similarly, metadata that describes an event may be automatically generated based on calendar data from a calendar if the calendar includes a calendar event having a time corresponding to the time when the content item was created. For example, if a content item is created at a time when the calendar indicates that a user is attending an event, the electronic device 201 may determine that the content was created at the event described in the calendar and may populate the metadata describing the event based on the calendar event entry in the calendar. For example, metadata describing the event may be populated based on the title of the calendar event entry in the calendar.

Similarly, in at least some embodiments, metadata 306a, 306b, 306c specifying people referred to or captured in the content item (such as the name of a person who is the subject of an image, video or text based document) may be automatically populated by performing a recognition algorithm on the content. For example, when the content item is an image or video, a facial recognition algorithm may be performed to compare persons represented in the image or video to a database of known persons. When a match is found, the metadata may be populated to include identification information identifying the known person, such as a name of the person.

Completion Requirements

As noted in the discussion of FIG. 1 above, in some embodiments, action items 300 may be associated with one or more completion requirements 305. The completion requirements 305 specify one or more requirements for completing the action associated with the action item 300. As noted above, action items 300 may be associated with completion requirements 305 while archives 302 may not be associated with completion requirements 305. Accordingly, in at least some embodiments, completion requirements 305 may be obtained for action items 300 but not for archives 302.

An overview having been provided, reference will now be made to FIG. 4 which illustrates an example method 400 of storing a content item in accordance with a selected classification option. The method 400 may include a number of features that are described above with reference to the method 350 of FIG. 2. Such features are generally indicated using common reference numerals and the description of such features will not be exhaustively repeated. The features of the method 400 will be discussed with reference to the example display screen 500 of FIG. 5.

At 352, selectable content classification options 366 (FIG. 4) may be displayed in the manner described above with reference to FIG. 2. At 354, a selection of a content classification option 366 is received as also described above with reference to FIG. 2. In at least some embodiments, at 356, a content item may be obtained in the manner described above with reference to FIG. 2.

In at least some embodiments, at 402, the electronic device 201 may determine whether a selection of the option 368 (FIG. 3) to classify the content item as an action item 300 has been received. If selection of this option is received, then the electronic device 201 may, at 404, display a prompt 502, 504, 506, 508 (FIG. 5) on the display 204 (FIG. 1). The prompt may be a prompt requesting input of a completion requirement 305 associated with the content item.

In response to displaying the prompt, at 406 input of a completion requirement may be received.

Figure 5:
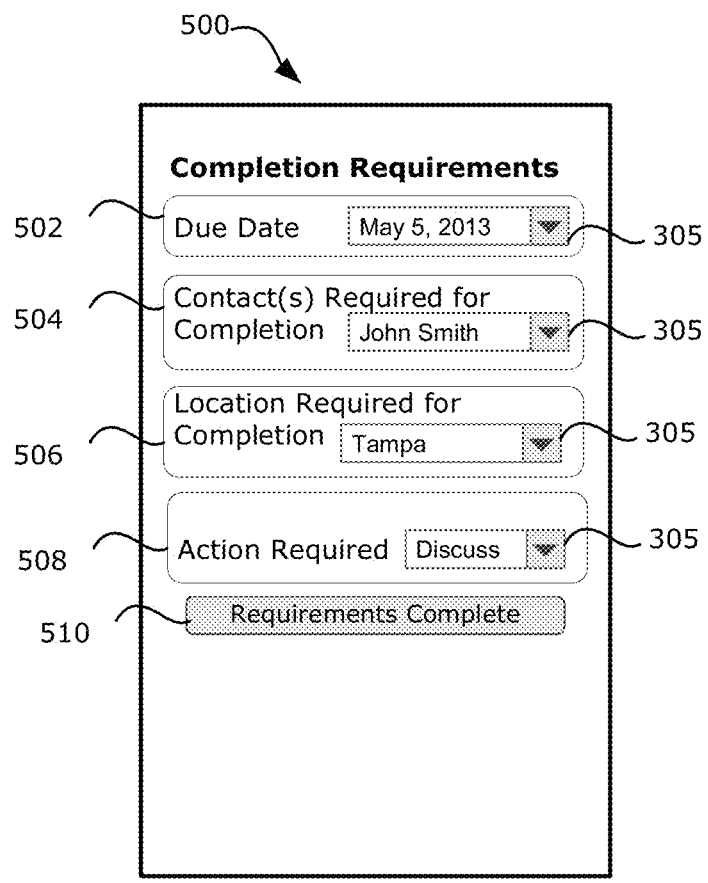
FIG. 5 is an example display screen in accordance with example embodiments of the present disclosure.

Referring briefly to FIG. 5, a display screen 500 is illustrated that allows for input of one or more completion requirements 305. More particularly, the display screen acts as a prompt to request input of one or more completion requirements. In the embodiment illustrated, the display screen includes a date prompt 502 which prompts for input of a "when" completion requirement (which may also be referred to as a due date or deadline). The "when" completion requirement may specify a date or time period during which the action item 300 is to be completed or when a reminder to complete the action item 300 is to be generated. Such a date or time may be referred to as a due date or deadline.

In some embodiments, the content management application 226 may allow a user to input imprecise timing information associated with the content item. Such imprecise timing information may specify an imprecise time period for completing the action item 300. For example, the content management application 226 may provide a graphical user interface that allows a user to select any one or combination of the following: "soon", "someday", "far off", "ASAP," "yesterday", "now". In at least some embodiments, such imprecise terms may be associated with more precise time periods in memory for the purposes of generating reminders. That is, imprecise timing information may be mapped to more precise timing information. By way of example, "soon" may be mapped to a time period of one week so that, after a week has elapsed, a reminder is generated based on the action item 300.

In some embodiments, more precise timing information may be input by a user. For example, in some embodiments, the content management application 226 may provide a graphical user interface that allows a user to specify a precise time period (such as, for example, "one day", "two days", "one week", "one month", etc.). In some embodiments, the date prompt 502 may allow a user to specify a calendar date which may be specified in terms of a day, month and/or year.

By way of further example, the display screen 500 includes a required-contact prompt 504 which prompts for input of a contact (such as a person or business) that is to be associated with the action item 300. The contact may be someone whose presence will be necessary or desirable for completion of the action represented by the action item 300. For example, completion of the action may require discussions with the contact. Such a required contact may be referred to as a "who" completion requirement. In at least some embodiments, the required-contact prompt 504 is linked to an address book associated with the electronic device 201, allowing a user to select, from the address book, a contact who is to be associated with the content item.

In the example illustrated, the display screen 500 includes a required-location prompt 506 which prompts for input of a location associated with the action item. The location may, for example, be a location where the action item 300 is to be completed or where the action item 300 may be completed or may be a location where the user wishes to be reminded of the action item 300. That is, a location related to the action item 300 may be specified (such as a location at which the action item 300 will become relevant). When such a location is specified for an action item 300, the location may be referred to as a "where" completion requirement for that action item 300.

By way of further example, the display screen 500 may also include a prompt 508 requesting input of a description of the action required to complete the action item 300. For example, a description may be selected from a list of default descriptions. In some embodiments, a description may be input using a freeform text input field.

In the example display screen 500 of FIG. 5, after a user has input one or more completion requirements 305, they may select a selectable option 510 to confirm the completion requirements 305. That is, the selectable option 510 may be selected to advise the electronic device 201 that the user has finished inputting completion requirements. The electronic device 201 may receive confirmation that the user has completed entry of the completion requirements 305 that are to be associated with the action item 300.

Referring again to FIG. 4, if it is determined (at 402) that the option 368 to classify the content item as action item 300 has not been selected (i.e. if the user has elected to classify the content item as an archive 302), then the prompt for input of the completion requirements 305 is not displayed (i.e. 404 is not performed) and input of completion requirements 305 is not received (i.e. 406 is not performed).

In some embodiments, at 357, metadata which is to be associated with the content item is obtained. Methods of obtaining such metadata are described in greater detail above with reference to FIG. 2.

At 358, the content item may be stored in accordance with the selected classification option in the manner described above with reference to FIG. 2. In some embodiments, at 358, one or more completion requirements 305 may be associated with the content item. That is, if the option 368 to classify the content as an action item 300 was selected, then the action item 300 may associate the content item with received completion requirements 305. If the option 370 to classify the content as an archive 302 was selected (i.e. if, at 358, the electronic device 201 is storing the content item as an archive 302), then the content item may be stored without any completion requirements 305 being associated therewith. That is, since an archive 302 represents a content item for which no concrete action is planned, there are no completion requirements 305 for the archive 302.

In at least some embodiments, at 410, the electronic device 201 may generate a reminder based on a completion requirement 305 if any such completion requirement has been specified. Since no completion requirements are specified for archives 302, no reminders are generated based on archives. However, since completion requirements 305 may be specified for action items 300, reminders may be generated for action items.

For example, a reminder condition may be based on a "when" completion requirement which identifies a deadline for completing the action item. In such embodiments, a reminder may be triggered based on the deadline; for example, if the deadline expires and/or if a deadline is approaching, a reminder may be triggered. For example, if the timing information specifies a time period for completing the action item, then, after the time period has elapsed, if the action item is not marked completed, a reminder may be triggered.

Similarly, in some embodiments, a reminder condition may be based on a "who" completion requirement. The "who" completion requirement may specify a contact (such as a person known to the user of the electronic device 201) who is to be involved in completing the action item. In such embodiments, the content management application 226 may trigger a reminder based on the "who" completion requirement by identifying possible interactions with that contact and by triggering a reminder when actual or possible interactions with that contact are identified.

Such interactions may be identified, for example, using a location sharing service. A location sharing service is a service which shares location information specifying a contact's current or future location. By way of example, the location sharing service may be Foursquare™. In at least some such embodiments, the content management application 226 may determine whether an interaction with the contact is possible or likely based on the location of the contact provided by the location sharing service. In at least some embodiments, the content management application 226 may determine whether the contact is close to the electronic device 201. This determination may be made, for example, by comparing a location of the electronic device 201 (which may be obtained from a location sensor 261 (FIG. 1) such as a GPS sensor) with the location of the contact, as provided by the location sharing service. If the electronic device is determined to be sufficiently close to the contact, then the reminder may be triggered.

The determination regarding whether the electronic device 201 is sufficiently close to the contact may be made by comparing the distance between the electronic device and the contact's location to a threshold. This threshold need not be the same for all contacts. More specifically, in some embodiments, the threshold used will depend on established norms for the contact. For example, if the contact is typically very far from the electronic device 201 (e.g. if the contact and the user of the device live and work in different cities than one another), then the threshold may be higher than if the contact is typically relatively close to the electronic device 201. Accordingly, the determination regarding whether the contact and the electronic device 201 are sufficiently close to one another to trigger a reminder may be based on established norms. Using this technique, a reminder for an action item associated with an out-of-town contact may be triggered when that contact is in town, but a reminder for an action item associated with a co-worker who works near the user of the electronic device may not be triggered when that co-worker is in town. Instead, for the co-worker, the threshold may be much smaller before the reminder is triggered.

In other embodiments, instead of relying on a location sharing service to determine whether the contact is sufficiently close to the electronic device 201 to trigger the reminder, the content management application 226 may rely on an address (such as a home address or work address) associated with the contact which is defined in a contact record for that contact. More specifically, the electronic device 201 may identify its own current position using the location sensor 261 and may identify an address associated with the contact from a contact record for that contact. The electronic device 201 may then identify a possible interaction based on the current position of the electronic device 201 and the address. More specifically, the content management application 226 may determine whether the electronic device is currently sufficiently close to the address. This determination may be made, for example, by comparing the distance between the electronic device and the contact's address to a threshold. As noted above, the threshold need not be the same for all contacts and may be based, for example, on established norms (i.e. typical distances between the electronic device 201 and the address). If the electronic device 201 is determined to be sufficiently close to the address, the reminder may be triggered.

In some embodiments, the content management application 226 may identify possible interactions with the contact by identifying planned travel to a region associated with the contact. For example, the content management application 226 may scan emails received at the electronic device 201 and may identify emails which contain travel itinerary information. Such emails may, for example, specify hotel reservation information, flight information, or other types of reservation information. When travel is planned to a region associated with the contact (such as a city where the contact resides), then the reminder may be triggered.

In at least some embodiments, the content management application 226 may not, itself, scan emails to identify travel information. Instead, the content management application 226 may rely on another application, such as Blackberry Travel™ which reviews such emails and which identifies trips and shares such information with the content management application 226.

In some embodiments, the content management application 226 may identify planned travel to a region associated with the contact by comparing a destination address input into a navigation application (such as Google Maps™ or another mapping application which provides navigation functions) to an address or location associated with the contact. For example, when a user requests directions to a location which is near the contact's location or address, then a reminder may be triggered.

Other techniques may be used to identify actual or possible interactions with the contact associated with the action item. For example, in at least some embodiments, the content management application 226 may monitor a calendar and may identify a possible interaction with the contact if an appointment is scheduled with that contact. When such an appointment is identified, a reminder may be triggered.

Similarly, in at least some embodiments, the content management application 226 may monitor communications on the electronic device 201 and may trigger the reminder if a communication with the contact associated with the action item is identified. For example, when a phone call is placed to or received from the contact, the reminder may be triggered. Where an email is being composed to the contact (i.e. if the contact is listed as a recipient), then the reminder may be triggered. If a text message is composed to the contact, then the reminder may be triggered. If an instant messaging conversation is occurring with the contact, then the reminder may be triggered.

In some embodiments, a reminder condition which is used to trigger a reminder may be based on a "where" completion requirement which specifies a location associated with the action item 300. That is, a reminder condition used to trigger a reminder may comprise a location associated with the action item. In at least some such embodiments, a reminder may be triggered based on the location associated with the action item and also based on the current or future location of the electronic device (and/or its user). For example, the reminder may be triggered when the electronic device 201 (or the user) is determined to be close to the location associated with the action item or may be triggered when the user is planning on being close to the location.

The current or future location of the electronic device 201 or the user may be determined according to any of the methods described above. More specifically, a location sensor 261 may be utilized or planned travel may be identified by scanning emails or by monitoring requests for directions in a navigation application. The determination as to whether the electronic device 201 is currently or is expected to be close enough to the location associated with the action item to cause the reminder to be triggered may be made using one or more thresholds (e.g. if the current or planned distance between the device and the location is less than a threshold, then the reminder may be triggered). These thresholds may not be the same for all locations. More specifically, in some embodiments, the threshold required to trigger a location-based reminder may be based on established norms. That is, the threshold may depend on the typical distance between the electronic device (or user) and the location. In this way, when a user travels to a faraway place, the threshold may be larger than when they are in their hometown.

When the reminder is generated at 410, a visual, audible or vibratory reminder may be generated on the electronic device 201. For example, the electronic device 201 may display a display screen which identifies the action item 300 which the user is being reminded of. In at least some embodiments, a user may be permitted to mark the action item as completed or may be permitted to dismiss or snooze the reminder.

The reminder of the action item may provide access to the content item. For example, the reminder may display the content item or may provide a link for accessing the content item.

Option to Store as Unclassified

Figure 4:
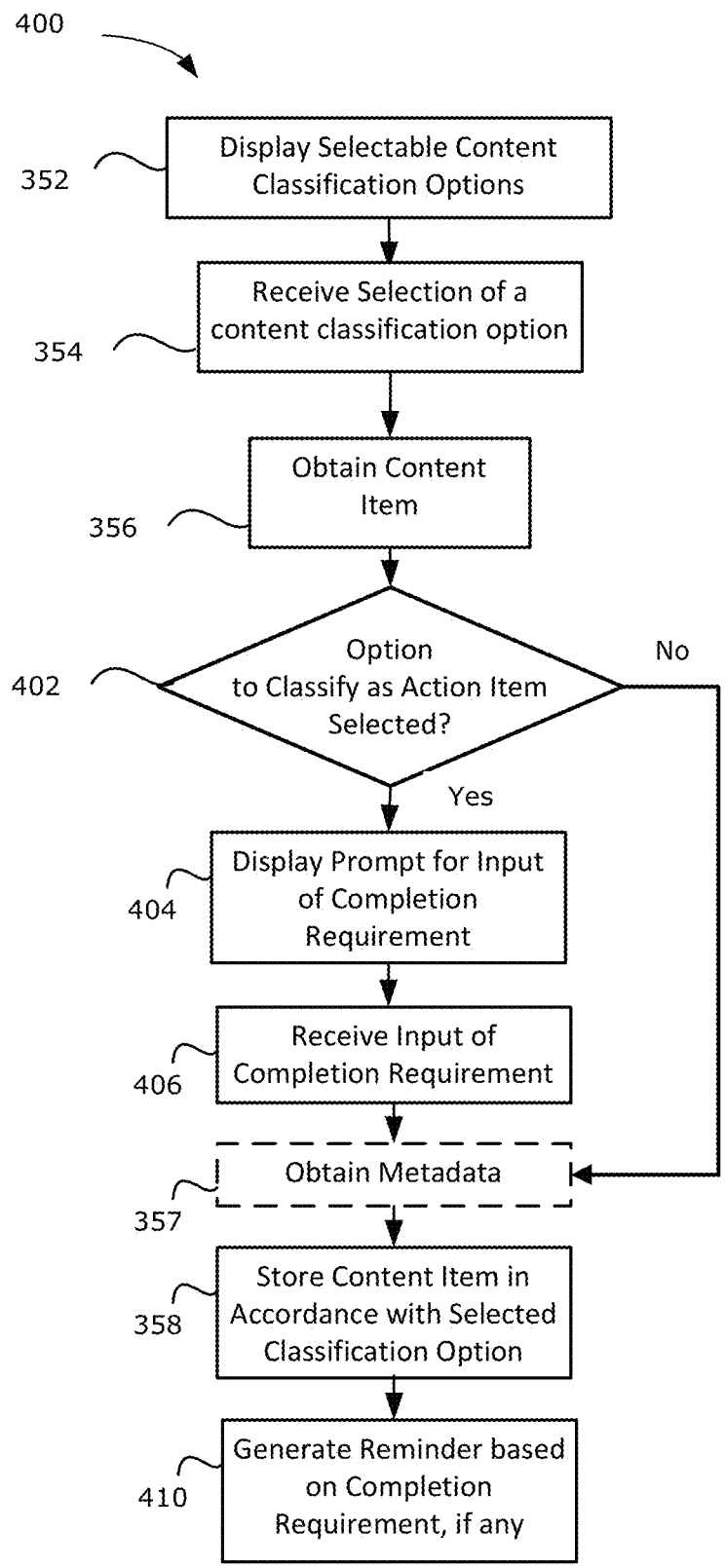
FIG. 4 illustrates a flowchart of an example method of storing content items in accordance with example embodiments of the present disclosure.

In at least some embodiments, the selectable content classification options 366 displayed at 352 of the methods 350, 400 of FIGS. 2 and 4, may include a selectable option 602 to store the content item as an unclassified content item 303.

Figure 6:
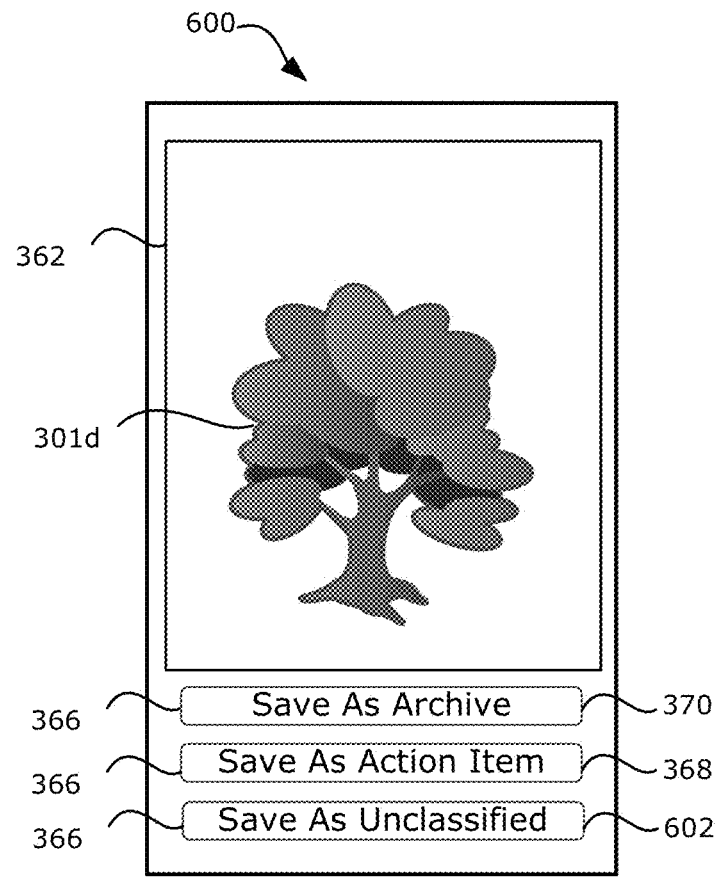
FIG. 6 is an example display screen in accordance with example embodiments of the present disclosure.

Referring now to FIG. 6, an example of one such display screen 600 is illustrated. The display screen 600 includes features that are also illustrated in the display screen 360 of FIG. 3. The discussion of these features will not be repeated. However, like reference numerals have been used to indicate like features. For example, the display screen 600 includes a viewfinder 362, a content item 301d, and a plurality of selectable content classification options 366. Much like the display screen 360 of FIG. 3, in the display screen 600 of FIG. 6, a selectable option 368 to classify the content item 301d as an action item 300 and a selectable option 370 to classify the content item 301d as an archive 302 are displayed. However, unlike the display screen 360 of FIG. 3, the display screen 600 includes a further content classification option 366. More particularly, the display screen 600 includes a selectable option 602 to store the content item 301d as an unclassified content item 303.

The selectable option 602 to store the content item 301d as an unclassified content item 303 may be used to allow a user to defer classifying a content item. That is, the selectable option 602 may be used when a user does not yet wish to classify the content item 301d as an archive 302 or an action item 300. For example, the selectable option 602 may be used when a user has not yet determined whether they would like to classify the content item as an archive or an action item or when they do not have time to classify the content item as an archive or an action item.

The selectable option 602 to store the content item as an unclassified content item 303 may operate in a similar manner to the other selectable options 368, 370. For example, in some embodiments, the selectable option 602 have a dual purpose—it may cause a content item to be obtained (e.g. it may act as a shutter button) and may also store the content item as an unclassified content item 303.

When the selectable option 602 to store the content item as an unclassified content item 303 is selected, the content item 301d is stored (e.g. at 358 of the methods 350, 500 of FIGS. 2 and 4) as an unclassified content item 303. Since the unclassified content item 303 has not yet been classified as an action item 300, it is stored without completion requirements 305.

In at least some embodiments, when the selectable option 602 to store the content item as an unclassified content item 303 is selected, the content item associated with the request is stored in a third container 309 (which may also be referred to as an unclassified container). As noted previously, the third container 309 may be a container that is reserved for storing content items 301c that are awaiting classification. In some embodiments, the third container 309 may store all content items 301c that have not yet been classified (i.e. it may store all content items that are stored as unclassified content items 303).

In some embodiments (such as the embodiment illustrated in FIG. 1), unclassified content items 303 may have metadata 306c associated therewith. Such metadata 306c may be of the type described above and the methods of obtaining such metadata may be the same as those described above with reference to 357 of FIG. 2.

Accessing Content Items

After a content item is stored, a user may wish to access the content item. Example techniques and methods for accessing such content items will now be described.

Reference will first be made to the example display screen 700 of FIG. 7. The example display screen 700 may, for example, be displayed in response to the receipt of user input requesting that the content items 301a, 301b, 301c be displayed.

In some embodiments, content items 301a, 301b, 301c may be selected and displayed based on their classification. For example, an action item list 702 may list action items 300. More particularly, the action item list 702 may include one or more content items 301a which have been classified as action items 300. The action item list 702 may exclude content items that have been classified as archives 302 and may also exclude unclassified content items 303. The action item list 702 may, for example, specify one or more completion requirements 305 associated with an action item 300. The action item list 702 may, in some embodiments, specify metadata associated with the action item.

Similarly, an archive list 704 may specify one or more archives 302. More particularly, the archive list 704 may include one or more content items 301*b* that have been classified as archives 302. The archive list 704 may exclude content items that have been classified as action items 300 and may also exclude unclassified content items 303. The archive list 704 may, in some embodiments, specify metadata 306*b* associated with the archive 302.

Similarly, an unclassified-content-item list 706 may specify one or more unclassified content items 303. More particularly, the unclassified-content-item list 706 may include one or more content items 301*c* that have not yet been classified. The unclassified-content-item list 706 may exclude content items that have been classified as action items 300 or archives 302. The unclassified-content-item list 706 may, in some embodiments, specify metadata 306*c* associated with the unclassified content items 303.

In at least some embodiments, the electronic device 201 may be configured to allow one or more of the lists 702, 704, 706 to be filtered or searched. By way of example, the display screen 700 of FIG. 7 includes a selectable filtering option 708 for each of the lists. For example, the selectable filtering option 708 may allow for filtering or searching based on metadata and/or completion requirements.

While the display screen 700 illustrates an embodiment in which the lists 702, 704, 706 are displayed on a common display screen 700, in other embodiments, each list may be displayed on a separate display screen. In yet other embodiments, two of the lists 702, 704, 706 illustrated in FIG. 7 may be displayed on a common display screen.

In some embodiments, content items 301*a*, 301*b*, 301*c* displayed in the lists 702, 704, 706 may be selectable. Selection of such content items 301*a*, 301*b*, 301*b* may cause a further display screen 800 (FIG. 8), 900 (FIG. 9), 1000 (FIG. 10) to be displayed on the display 204. Such further display screens may display the content item 301*a*, 301*b*, 301*c* and/or may allow a user to manage such content items 301*a*, 301*b*, 301*c*.

Referring first to FIG. 8, an example of a display screen 800 is illustrated. The display screen 800 may be used for managing an action item 300.

The display screen displays the content item 301*a*. The display screen also includes a selectable option 802 to set a completion indicator and/or progress indicator associated with the action item 300 (in the example embodiment, this option 802 is labelled "Mark as Completed"). A completion indicator may be a flag that may be set to complete or incomplete to indicate whether the action associated with an action item 300 has been completed. Accordingly, the completion indicator may have two possible values—complete or incomplete. In contrast, a progress indicator may allow greater precision in describing a status of an action item. For example, a progress indicator may specify the degree to which the action has been completed (e.g. it may be specified as a percentage, such as 50%). In some embodiments, the progress indicator may allow a text-based status to be set to indicate the level of completion of the action associated with an action item 300. By way of example, the progress indicator may be set to "not started", "in progress," "waiting for feedback," or "done."

The display screen also displays a selectable option 804 to edit the action item 300. Selection of this option 804 may allow a user to edit the content item 301*a*, or information associated with the content item 301*a*, such as metadata 306*a* or a completion requirement 305 associated therewith.

The display screen 800 may also include a selectable option 806 to share a content item 301*a*, 301*b*, 301*c*. In the example illustrated, the selectable option 806 is a selectable command button labelled "share." However, the selectable option 806 may take other forms. Selection of the selectable option 806 to share the content item may engage a sharing framework associated with the electronic device 201 which allows content to be shared.

The sharing framework, in at least some embodiments, may allow content to be shared in a number of different ways. That is, the sharing framework may allow a number of different sharing services to be accessed to share the content item. For example, the sharing framework may, in at least some embodiments, be configured to allow content to be shared with others via electronic mail (e.g. send an email with the content item or a link to the content item). Other methods of sharing may also be provided by the sharing framework.

The display screen 800 also includes a selectable option 808 to delete the content item. Selection of the selectable option 808 to delete the content item may cause the content item to be deleted in accordance with a deletion policy.

Figure 9:
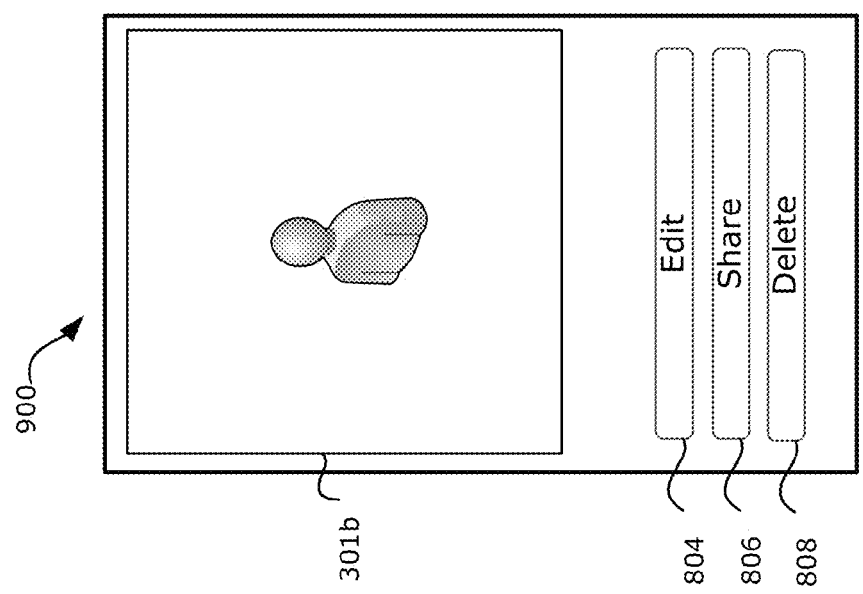
FIG. 9 is an example display screen in accordance with example embodiments of the present disclosure.

Referring now to FIG. 9, an example of a further display screen 900 is illustrated. The display screen 900 may be used for managing an archive 302. The display screen 900 of FIG. 9 includes many features included in the display screen 800 of FIG. 8. For example, the display screen displays the content item 301*b*, includes a selectable option 804 to edit the archived content item, a selectable option to 806 to share the archived content item and a selectable option 808 to delete the archived content item.

However, the display screen 900 of FIG. 9 does not include a selectable option 802 (FIG. 8) to set a completion indicator and/or progress indicator associated with the archived content item.

Furthermore, in some embodiments, the selectable option 808 to delete the content item may operate differently for an archived content item than for an action item. For example, when the electronic device receives a request to delete a content item it may apply different deletion policies for archives than for action items. For example, if the content item is an archive, a higher level deletion policy may be applied and, if the content item is an action item, then a lower level deletion policy may be applied.

A higher level deletion policy is a policy that may make deletion more difficult than a lower level deletion policy. For example, a higher level deletion policy may require a greater number of steps to perform a deletion than a lower level deletion policy.

Figure 10:
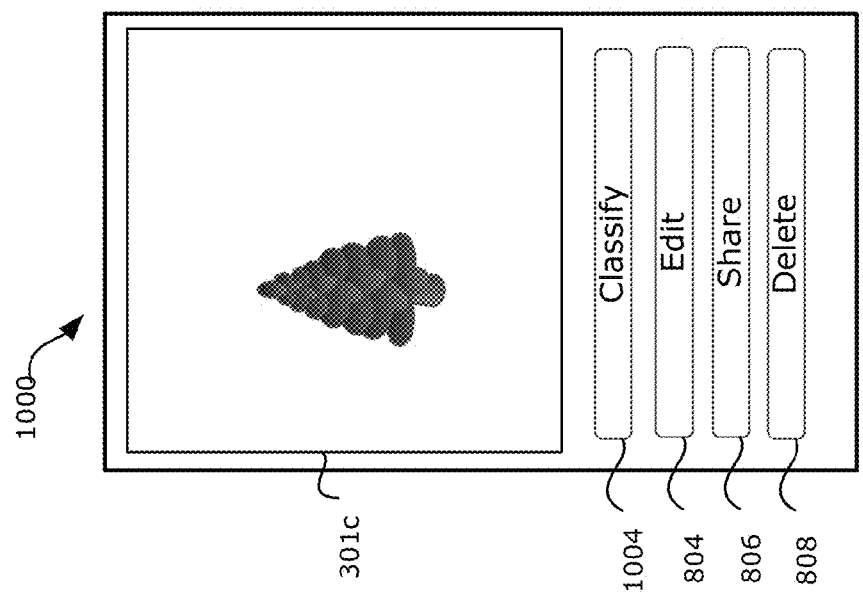
FIG. 10 is an example display screen in accordance with example embodiments of the present disclosure.

Referring now to FIG. 10, an example of a further display screen 1000 is illustrated. The display screen 1000 may be used for managing an unclassified content item 303. The display screen 1000 of FIG. 10 includes many features included in the display screen 800 of FIG. 8. For example, the display screen displays a content item 301*c*, includes a selectable option 804 to edit the content item, a selectable option to 806 to share the content item and a selectable option 808 to delete the content item.

However, the display screen 1000 of FIG. 10 does not include a selectable option 802 (FIG. 8) to set a completion indicator and/or progress indicator associated with the content item.

The display screen 1000 of FIG. 10 further includes a selectable option 1004 to classify the content item 301c. More particularly, the selectable option 1004 may allow the content item to be classified, for example, as either an archive 302 or as an action item 300.

It will be appreciated that the display screens 800, 900, 1000 may have options and features in addition to those described above and that one or more of the options or features described above may be omitted from one or more of the display screens 800, 900, 1000 in some embodiments.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of storing content, the method comprising:
  displaying, on a display of an electronic device, a plurality of user selectable content classification options for classifying a content item, the user selectable content classification options including a user selectable option to classify the content item as an action item, a user selectable option to classify the content item as an archive, and a user selectable option to store the content item as an unclassified content item to defer classification of the content item;
  receiving, via an input interface associated with the electronic device, a selection of one of the content classification options;
  in response to receiving selection of one of the content classification options, capturing the content item;
  storing the content item in accordance with the selected content classification option; and
  when the user selectable option to classify the content item as an action item is selected, providing at least one management input prompt that is not provided when the user selectable option to classify the content item as an archive is selected, wherein the management input prompt requests completion requirements; and
  when the user selectable option to classify the content item as an archive is selected, providing at least one management input prompt that is not provided when the user selectable option to classify the content item as an action item is selected, wherein the management input prompt requests completion requirements,
  wherein the user selectable option to classify the content item as an action item is an option to store the content item as a record of a future action, and wherein the user selectable option to classify the content item as an archive is an option to store the content item with other content items classified as an archive, and wherein, when the user selectable option to store the content item as an unclassified content item is selected, the storing of the content item occurs without prompting for completion requirements.

2. The method of claim 1, wherein storing the content item in accordance with the selected content classification option comprises storing the content item in a first container if a selection of the option to classify the content item as an action item is received and storing the content item in a second container if a selection of the option to classify the content item as an archive is received.

3. The method of claim 1, wherein storing the content item in accordance with the selected content classification option comprises:
  creating an action item based on the content item if the user selectable option to classify the content as an action item is selected; and
  storing the content item as an archive if the user selectable option to store the content item as an archive is selected.

4. The method of claim 3, wherein creating an action item based on the content item comprises:
  associating one or more completion requirements with the content item,
  and wherein storing the content item as an archive comprises:
  storing the content item without any completion requirements being associated therewith.

5. The method of claim 4, further comprising, prior to associating one or more completion requirements with the content item:
  if a selection of the option to classify the content item as an action item is received:
    displaying, on the display, a prompt for input of a completion requirement associated with the content item; and
    receiving input of the completion requirement.

6. The method of claim 5, wherein the completion requirement specifies a due date.

7. The method of claim 4, further comprising:
generating a reminder based on the completion requirement.

8. The method of claim 1, further comprising, after storing the content item in accordance with the selected content classification option:
receiving a request to delete the content item and, in response:
if the content item is an archive, applying a higher level deletion policy;
and if the content item is an action item, applying a lower level deletion policy.

9. The method of claim 1, wherein the content item is audio, video, text, or an image.

10. An electronic device comprising:
a display;
an input interface;
a processor coupled with the display and the input interface;
a memory coupled with the processor, the memory containing processor executable instructions which, when executed by the processor, cause the processor to:
display, on a display of an electronic device, a plurality of user selectable content classification options for classifying a content item, the user selectable content classification options including a user selectable option to classify the content item as an action item, a user selectable option to classify the content item as an archive, and a user selectable option to store the content item as an unclassified content item to defer classification of the content item;
receive, via an input interface associated with the electronic device, a selection of one of the content classification options;
in response to receiving selection of one of the content classification options, capture the content item;
store the content item in accordance with the selected content classification option; and
when the user selectable option to classify the content item as an action item is selected, provide at least one management input prompt that is not provided when the user selectable option to classify the content item as an archive is selected, wherein the management input prompt requests completion requirements; and
when the user selectable option to classify the content item as an archive is selected, provide at least one management input prompt that is not provided when the user selectable option to classify the content item as an action item is selected, wherein the management input prompt requests completion requirements,
wherein the user selectable option to classify the content item as an action item is an option to store the content item as a record of a future action, and wherein the user selectable option to classify the content item as an archive is an option to store the content item with other content items classified as an archive, and wherein, when the user selectable option to store the content item as an unclassified content item is selected, the storing of the content item occurs without prompting for completion requirements.

11. The electronic device of claim 10, wherein storing the content item in accordance with the selected content classification option comprises storing the content item in a first container if a selection of the option to classify the content item as an action item is received and storing the content item in a second container if a selection of the option to classify the content item as an archive is received.

12. The electronic device of claim 10, wherein storing the content item in accordance with the selected content classification option comprises:
creating an action item based on the content item if the user selectable option to classify the content as an action item is selected; and
storing the content item as an archive if the user selectable option to store the content item as an archive is selected.

13. The electronic device of claim 12, wherein creating an action item based on the content item comprises:
associating one or more completion requirements with the content item,
and wherein storing the content item as an archive comprises:
storing the content item without any completion requirements being associated therewith.

14. The electronic device of claim 13, wherein the processor executable instructions further cause the processor to, prior to associating one or more completion requirements with the content item:
if a selection of the option to classify the content item as an action item is received:
display, on the display, a prompt for input of a completion requirement associated with the content item; and
receive input of the completion requirement.

15. The electronic device of claim 14, wherein the completion requirement specifies a due date.

16. The electronic device of claim 13, wherein the processor executable instructions further cause the processor to:
generate a reminder based on the completion requirement.

17. The electronic device of claim 10, wherein the content item is audio, video, text, or an image.

18. A non-transitory computer readable storage medium comprising computer executable instructions for:
displaying, on a display of an electronic device, a plurality of user selectable content classification options for classifying a content item, the user selectable content classification options including a user selectable option to classify the content item as an action item, a user selectable option to classify the content item as an archive, and a user selectable option to store the content item as an unclassified content item to defer classification of the content item;
receiving, via an input interface associated with the electronic device, a selection of one of the content classification options;
in response to receiving selection of one of the content classification options, capturing the content item;
storing the content item in accordance with the selected content classification option; and
when the user selectable option to classify the content item as an action item is selected, providing at least one management input prompt that is not provided when the user selectable option to classify the content item as an archive is selected, wherein the management input prompt requests completion requirements; and
when the user selectable option to classify the content item as an archive is selected, providing at least one management input prompt that is not provided when the user selectable option to classify the content item as an action item is selected, wherein the management input prompt requests completion requirements,
wherein the user selectable option to classify the content item as an action item is an option to store the content item as a record of a future action, and wherein the user selectable option to classify the content item as an archive is an option to store the content item with other content items classified as an archive, and wherein, when the user selectable option to store the content item as an unclassified content item is selected, the storing of the content item occurs without prompting for completion requirements.

* * * * *